Figure 3:
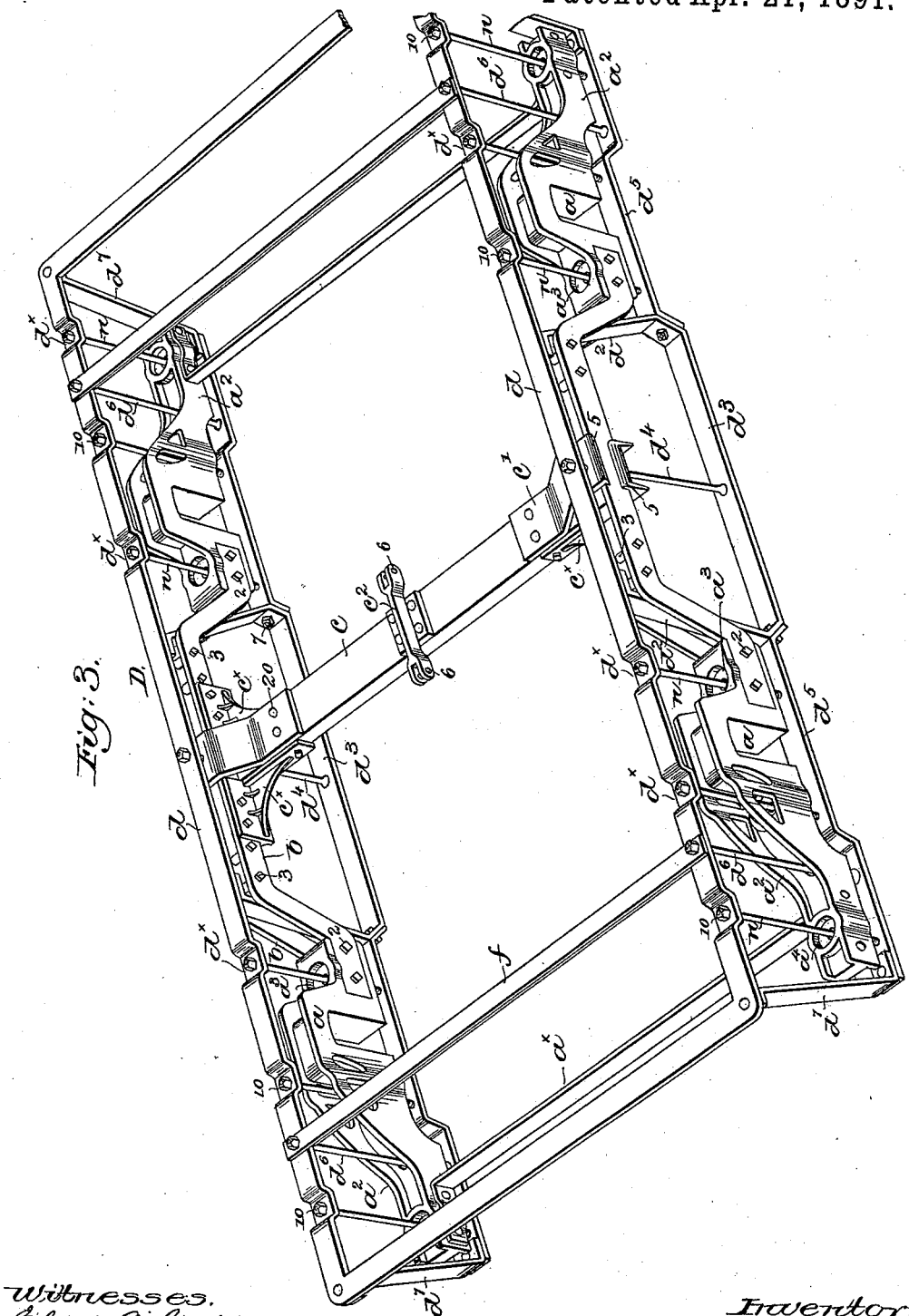

(No Model.) 2 Sheets—Sheet 1.
J. H. BICKFORD.
CAR TRUCK.
No. 450,608. Patented Apr. 21, 1891.
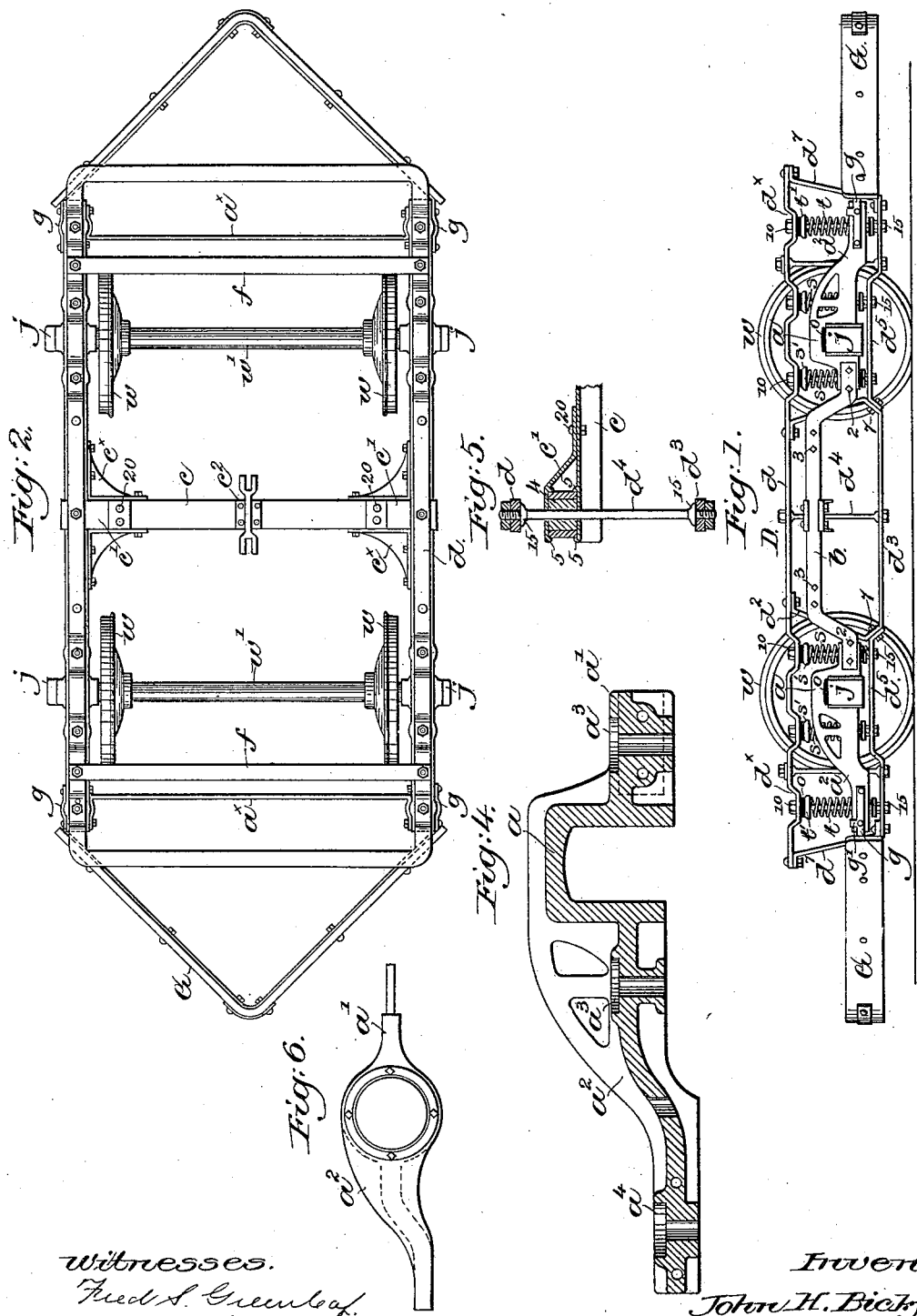
Witnesses.
Fred S. Greenleaf.
Edgar A. Godden
Inventor:
John H. Bickford
by Crosby & Gregory
Attys.

(No Model.) 2 Sheets—Sheet 2.

J. H. BICKFORD.
CAR TRUCK.

No. 450,608. Patented Apr. 21, 1891.

Witnesses.
Edgar A. Godden
Fred S. Greenleaf

Inventor.
John H. Bickford
by Crosby Gregory
attys

UNITED STATES PATENT OFFICE.

JOHN H. BICKFORD, OF SALEM, MASSACHUSETTS.

CAR-TRUCK.

SPECIFICATION forming part of Letters Patent No. 450,608, dated April 21, 1891.

Application filed November 25, 1890. Serial No. 372,606. (No model.)

*To all whom it may concern:*

Be it known that I, JOHN H. BICKFORD, of Salem, county of Essex, State of Massachusetts, have invented an Improvement in Car-Trucks, of which the following description, in connection with the accompanying drawings, is a specification, like letters and figures on the drawings representing like parts.

This invention has for its object to provide an improved car-truck; and the particular features of which the invention consists will be hereinafter described, and set forth in the claims.

Figure 1 represents in side elevation a truck embodying this invention; Fig. 2, a top or plan view thereof; Fig. 3, a perspective view, partially broken away, the wheels, springs, and other minor details being omitted for the sake of clearness; Figs. 4 and 5, sectional details to be referred to, and Fig. 6 shows a modification wherein the spring-carriers are formed integral with or bolted directly to the journal-box.

Referring to the drawings, the wheels $w$, mounted on the axles $w'$, having the usual journals, and the journal-boxes $j$ therefor are and may be of any usual kind.

The housings $a$ for the journal-boxes, as represented, support the spring-carriers $a'$ $a^2$, they being herein represented as formed in a single piece with the housing $a$; but they may be independent members bolted or otherwise secured to said housing, the said spring-carriers having formed therein seats $a^3$ $a^4$ for the springs $s$ and $t$, one of which spring-carriers, as $a'$, is formed to receive the ends of the arch-bars $b$, secured by bolts 2, (see Figs. 1 and 3), spacing-studs 3 being preferably employed between the arch-bars, and braces or tie rods $a^\times$ connecting the spring-carriers $a^2$ upon opposite sides of the truck to stiffen the construction.

The arch-bars $b$ upon opposite sides of the truck are connected together by the channel-bar $c$, having shoulders 5, (see Figs. 3 and 5,) between which said arch-bars rest, the said channel-bar being firmly secured to said arch-bars by means of the plates $c$, secured to the channel-bar by bolts 20, and also provided upon their under sides with shoulders 5, bolts 3 being passed from the plate $c'$ to the bar $c$ between the arch-bars and through the interposed spacing-block 4, as represented. Brackets $c^\times$ are preferably bolted to the channel-bar and arch-bars, as shown, to further strengthen the construction.

A support or bracket $c^2$, having eyes 6, is supported upon the channel-bar $c$ at its middle, by which the free or armature ends of of electric motors may be supported, as will be hereinafter described.

As represented, the spring-carriers $a^2$ are extended and dropped, as shown best in Figs. 1 and 4, so that the seats $a^4$ for the springs $t$ are considerably lower than the seats $a^3$ for the springs $s$, thus permitting the employment of springs $t$ longer than the usual springs $s$.

The springs $s$ and $t$ at their upper ends are provided with suitable sockets $s'$ $t'$, which support the movable frame D, consisting, as represented, of the bar $d$, extending completely around the truck and having bolted to it at each side, at substantially the middle, the ends $d^2$ of the U-shaped bar $d^3$, supported in the middle by the stud $d^4$, which passes down through the plate $c'$, block 4, and channel-bar $c$. (See Fig. 5.) Other bars $d^5$, bolted to the bars $d^3$ at 7 and supported by the studs $d^6$, have their outer ends supported by the braces $d^7$. (See Figs. 1 and 3.)

The top bar $d$ of the movable frame D is provided with depressions $d^\times$, which receive the nuts 10 on the threaded upper ends of the bolts $n$, extended down through the spring-sockets $s'$ $t'$, springs $s$ and $t$, the housing $a$, and bars $d^5$, (see Fig. 3,) said bolts receiving upon either side of the said bars $d^5$ other nuts 15, the said bolts $n$ serving to retain the springs in position.

The car-body (not shown) rests directly upon the bar $d$, and the nuts 10 on the bolts $n$, being located in the depressions $d^\times$, are accessible at all times from the side, permitting the slackening of the nuts 10 on the bolts $n$ and the removal of the springs without lifting the car-body, which would be necessary if the nuts were placed upon the top of a continuous straight bar not having the depressions.

By extending the housings or spring-carriers to receive the springs $t$ a much longer support is provided for the car-body to prevent undue oscillation without increasing the length of the wheel-base, which is limited. This is of manifest importance, with the prevailing tendency to use longer and heavier car-bodies.

I am aware that trucks have heretofore been constructed wherein springs have been supported outside of or beyond the usual springs $s$ for this purpose; but the springs being of equal length or even shorter than the springs $s$ necessitates making them exceedingly stiff to support the load, which necessarily causes the car to ride hard; but by dropping the housing or spring-carrier $a$ I am enabled to employ springs $t$ considerably longer than the springs $s$, which longer springs, while capable of supporting an equal load, are much more yielding than the short ones heretofore used and give to the car an easy-riding motion, the said springs at the same time having sufficient stiffness to prevent oscillation.

Cushions of rubber or other yielding material $o$ may be inserted between the journal-boxes and their housings and between the spring-sockets $s'$ $t'$ and the upper bar $d$, and also between the under side of the housings $a$ and the nuts 15, as shown, to prevent shocks and consequent noise.

The car-truck herein described is particularly adapted for electric-motor service, the motors being placed upon the axles $w'$ in any usual manner, their free armature ends being supported or hung from the eyes 6 in the bracket $c^2$ on the channel-bar $c$ in customary manner.

The arch-bars $b$, crowning as they do, give free access to the motors and permit the ready removal of the armature when necessary—a feature of the utmost importance.

The weight of the car, being carried principally by the springs $t$ upon the outside of the journal-boxes $j$, offsets or counterbalances the weight of the armature ends of the motors supported by the channel-bar upon the inner side of the said journal-boxes $c'$. Thus the two weights are substantially equalized upon the axles or journals as fulcra, enabling the truck to be made much lighter than otherwise.

Cross-bars $f$ are provided, from which may be suspended the usual brake-rigging.

The usual guards G may be bolted directly to the housings $a$, as shown, the supporting-irons $g$, having ears or hooks $g'$, which sustain the weight, bolts 15 being also employed.

While I have herein shown the spring-carriers as supported by and formed integral with the housings $a$, yet I do not desire to limit myself to this construction, as it is evident the spring-carriers may be formed integral with or bolted to the journal-boxes, as shown in Fig. 6, or formed as independent members secured to or resting on the said housings or journal-boxes.

It is obvious that the spring-carriers may be employed with straight or other than the arch bars $b$, or that the arch-bars may be employed without the spring-carriers, in which latter case the said arch-bars would be bolted or secured directly to the housings, the spring-carriers $a'$ then constituting a portion of the housing to which the arch-bars could be attached. It is also obvious that the bar $d$, provided with depressions $d^\times$, may be embodied in other frames than the particular one shown.

I do not desire to limit this invention to the particular shape and construction or arrangement of the various parts, as it is evident the same may be varied.

I claim—

1. The combination, with the journal-boxes, of the bars $b$, arched at their middle and having housings at each end, substantially as described.

2. The combination, with the journal-boxes, of housings therefor, bars $b$, connecting the same, said housings opposite the ends of the bars $b$ being extended and dropped below the level of said bars $b$ to form spring-carriers, substantially as and for the purpose set forth.

3. The combination, with the housings $a$, extended and dropped at $a'$ to form spring-carriers, of the arch-bars $b$, substantially as described.

4. The combination, with the housings $a$, extended and dropped at $a'$, of the arch-bars $b$ and bar $c$, supported thereby, substantially as described.

5. The combination, with the housings $a$, of the arch-bars $b$, the bar $c$, plates $c'$, and brackets $c^\times$, substantially as described.

6. In a car-truck, the movable frame D, the bar $d$ of which is provided with depressions $d^\times$, substantially as described.

7. The combination, with the housings $a$, the rods $a^\times$, and the arch-bars $b$, of the moving frame D, consisting of the bar $d$, bars $d^3$ $d^5$, and studs $d^4$ $d^6$, and braces $d^7$, substantially as described.

8. The combination, with the housings $a$, extended and dropped at their outer ends, and arch-bars $b$, of the guards G and supporting-irons $g$ therefor, secured to the outer ends of said housings, substantially as described.

In testimony whereof I have signed my name to this specification in the presence of two subscribing witnesses.

JOHN H. BICKFORD.

Witnesses:
BERNICE J. NOYES,
EMMA J. BENNETT.